(12) United States Patent
Iikawa et al.

(10) Patent No.: US 6,594,088 B2
(45) Date of Patent: Jul. 15, 2003

(54) METHOD FOR MOLDING CAM RING WITH CONVEX CAMS, MOLDING DIE ASSEMBLY, AND MOLDED CAM RING

(75) Inventors: Makoto Iikawa, Saitama (JP); Takuji Hamasaki, Saitama (JP)

(73) Assignee: Pentax Corporation, Tokyo (JP)

( * ) Notice: Subject to any disclaimer, the term of this patent is extended or adjusted under 35 U.S.C. 154(b) by 160 days.

(21) Appl. No.: 09/920,639

(22) Filed: Aug. 3, 2001

(65) Prior Publication Data
US 2002/0020937 A1 Feb. 21, 2002

(30) Foreign Application Priority Data
Aug. 9, 2000 (JP) .................................. 2000-241719

(51) Int. Cl.⁷ .............................. G02B 15/14; B29D 1/00
(52) U.S. Cl. ....................... 359/701; 359/699; 359/700; 264/318
(58) Field of Search ................................ 359/699, 700, 359/701, 704; 249/59; 264/318; 425/58

(56) References Cited

U.S. PATENT DOCUMENTS

| | | |
|---|---|---|
| 5,191,482 A * | 3/1993 | Sekiguchi ................ 359/819 |
| 5,255,124 A | 10/1993 | Iwamura |
| 5,907,439 A * | 5/1999 | Matsui ........................ 359/700 |
| 6,390,804 B1 * | 5/2002 | Akino et al. ................. 425/556 |

* cited by examiner

Primary Examiner—Jordan M. Schwartz
Assistant Examiner—Timothy Thompson
(74) Attorney, Agent, or Firm—Greenblum & Bernstein, P.L.C.

(57) ABSTRACT

A method for molding a cam ring which is provided on the peripheral surface thereof with convex cams whose shape in a developed view is non-linear, the cams overlapping each other at the ends thereof as viewed in the axial direction of the cam ring. The method includes setting first and second cylindrical split molding dies so that cam forming surfaces thereof are located in a normal molding position; and upon completion of a molding operation, rotating the first and second cylindrical split molding dies relative to each other and relative to the molded cam ring, in a direction of an angle not greater than the minimum angle defined between a tangential line on each corresponding the front and rear cam surfaces and the plane including the axis of the cam ring, to thereby part the first and second cylindrical split molding dies from the molded cam ring.

8 Claims, 7 Drawing Sheets

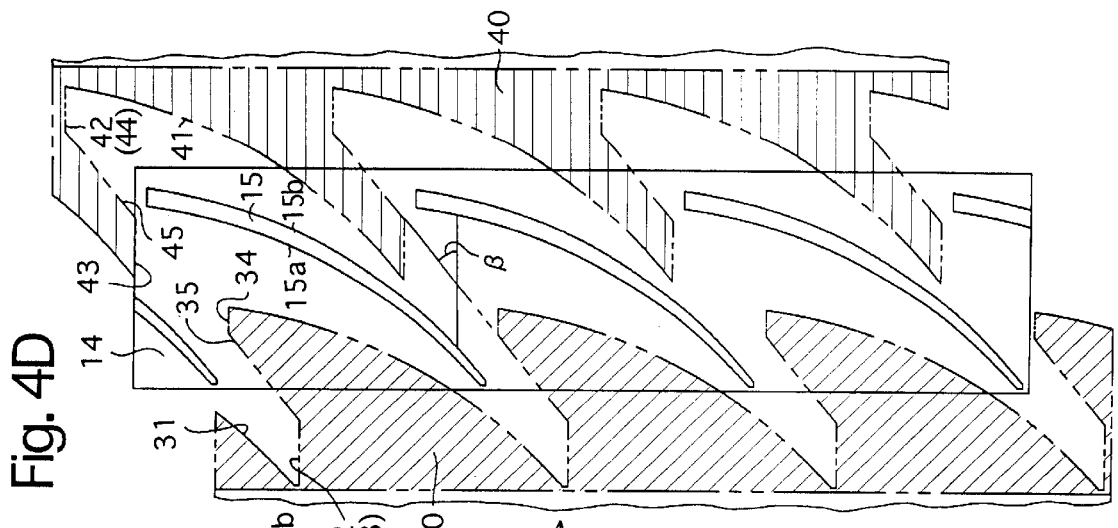
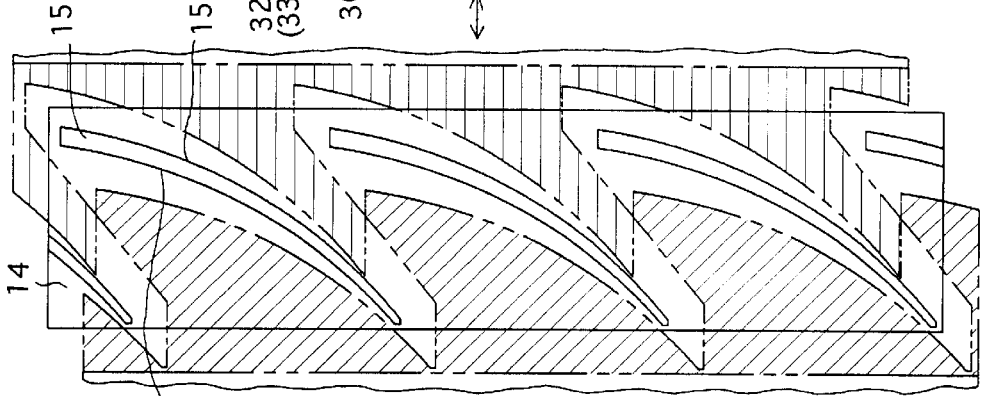
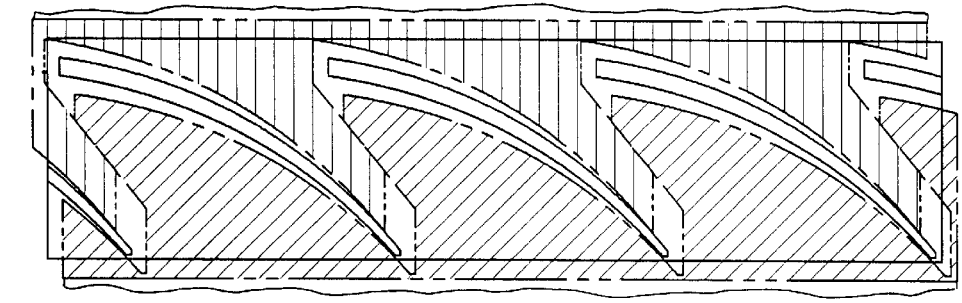
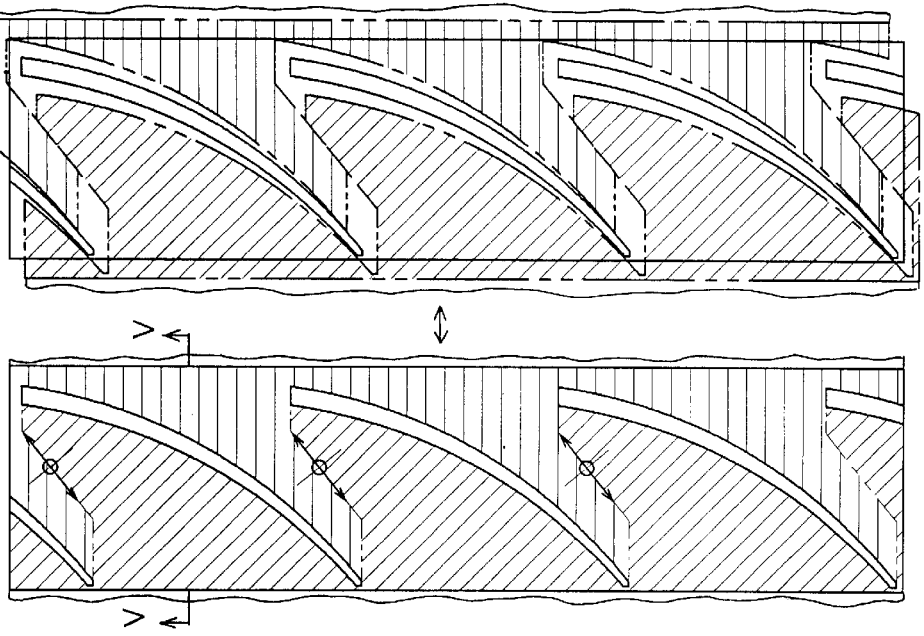

METHOD FOR MOLDING CAM RING WITH CONVEX CAMS, MOLDING DIE ASSEMBLY, AND MOLDED CAM RING

BACKGROUND OF THE INVENTION

1. Field of the Invention

The present invention relates to a method for molding a cam ring with convex cams, a molding die assembly therefor, and a molded cam ring.

2. Description of the Related Art

For example, a conventional lens barrel is provided on its peripheral surface (inner and/or outer peripheral surface), with a cam ring having a convex cam. A molding die assembly to mold the cam ring from a synthetic resin material is moved in the axial direction of the cam ring. To this end, if a plurality of identical convex cams are provided on the peripheral surface of the cam ring, it is necessary to form the convex cams so as not to overlap each other at the ends thereof, with respect to the axial direction thereof. Namely, in the case of a cam ring having, on its peripheral surface, for example, four identical convex cams which are spaced from one another at an equal angular distance, if the length of each convex cam in the circumferential direction is greater than 90 degrees, it is impossible to part the molding die which is moved in the axial direction of the cam ring from the molded product.

Of course, even if the convex cams partly overlap at the ends thereof with respect to the axial direction of the cam ring, it is in theory possible to realize a molding die capable of parting, by providing a complicated split structure for the molding die assembly. In this case, however, parting lines of the molding dies are produced on the cam surfaces of the convex cam. A parting line on the cam surface makes the cam surface profile defective, and accordingly, such a method is undesirable.

SUMMARY OF THE INVENTION

It is an object of the present invention to provide a method and a die assembly for molding a cam ring having a plurality of convex cams whose ends overlap in the axial direction, wherein the cam ring can be molded without producing a parting line on the cam surface, and to provide a cam ring molded via such a method.

In order to achieve the above-mentioned objects, a method is provided for molding a cam ring from synthetic resin, the cam ring being provided on the peripheral surface thereof with a plurality of convex cams whose shape in a developed view is non-linear so that an angle defined between a tangential line on each convex cam and a plane including an axis of the cam ring is smoothly varied, the convex cams overlapping each other at the ends thereof as viewed in the axial direction of the cam ring, wherein a first cylindrical split molding die having a cam forming surface corresponding to one of front and rear cam surfaces of the convex cams, and a second cylindrical split molding die having a cam forming surface corresponding to the other of the front and rear cam surfaces of the convex cams are provided. The method includes setting the first and second cylindrical split molding dies so that the respective cam forming surfaces are located in a normal molding position to mold the cam ring having the convex cams; and upon completion of a molding operation, rotating the first and second cylindrical split molding dies relative to each other and relative to the molded cam ring, in a direction of an angle not greater than the minimum angle defined between the tangential line on each corresponding the front and rear cam surfaces and the plane including the axis of the cam ring, to thereby part the first and second cylindrical split molding dies from the molded cam ring.

In an embodiment, the cam forming surfaces of the first and second cylindrical split molding dies and a plane which includes an axis of the cam ring and intersects the cam forming surfaces are perpendicular to each other.

According to an aspect of the present invention, a molded cam ring having convex cams can be provided, wherein the molded cam ring is produced by the above-described method.

According to another aspect of the present invention, a molding die assembly is provided, for molding a cam ring from synthetic resin, the cam ring being provided on the peripheral surface thereof with a plurality of convex cams whose shape in a developed view is non-linear so that an angle defined between a tangential line on each convex cam and a plane including an axis of the cam ring is smoothly varied, the convex cams overlapping each other at the ends thereof as viewed in the axial direction of the cam ring, the molding die assembly including a pair of cylindrical split molding dies having cam forming surfaces corresponding to front and rear cam surfaces of the convex cams, respectively; and oblique parting surfaces provided on the pair of cylindrical split molding dies respectively, the parting surfaces being oriented in a direction of an angle not greater than the minimum angle defined between the tangential lines on the front and rear cam surfaces and a plane including the axis of the cam ring. The oblique parting surfaces are entirely brought into surface contact with each other when the cam forming surfaces are located in a normal molding position, and the cylindrical split molding dies are relatively rotatable along the oblique parting surfaces.

In an embodiment, the cam forming surfaces of the cylindrical split molding dies and a plane which includes an axis of the molded cam ring and intersects the cam forming surfaces are perpendicular to each other.

According to an aspect of the present invention, a molded cam ring can be produced by the above-described molding die assembly.

According to another aspect of the present invention, a cam ring molded from synthetic resin is provided, having on the peripheral surface thereof a plurality of convex cams whose shape in a developed view is non-linear so that an angle defined between a tangential line on each convex cam and a plane including an axis of the cam ring mold is smoothly varied, the convex cams overlapping each other at the ends thereof as viewed in the axial direction of the cam ring, wherein a parting line is not produced on the cam surfaces of the convex cams by split molding dies which are used to form the cam ring mold.

In an embodiment, cam forming surfaces of the split molding dies and a plane which includes an axis of the molded cam ring and intersects the cam forming surfaces are perpendicular to each other.

The present disclosure relates to subject matter contained in Japanese Patent Application No. 2000-241719 (filed on Aug. 9, 2000) which is expressly incorporated herein by reference in its entirety.

BRIEF DESCRIPTION OF THE DRAWINGS

The invention will be discussed below with reference to the accompanying drawings, in which:

FIGS. 4A, 4B, 4C and 4D are developed views of a molding die shown in FIG. 3, showing the transition from a molding position to a parting position;

DESCRIPTION OF THE PREFERRED EMBODIMENT

Figure 1:
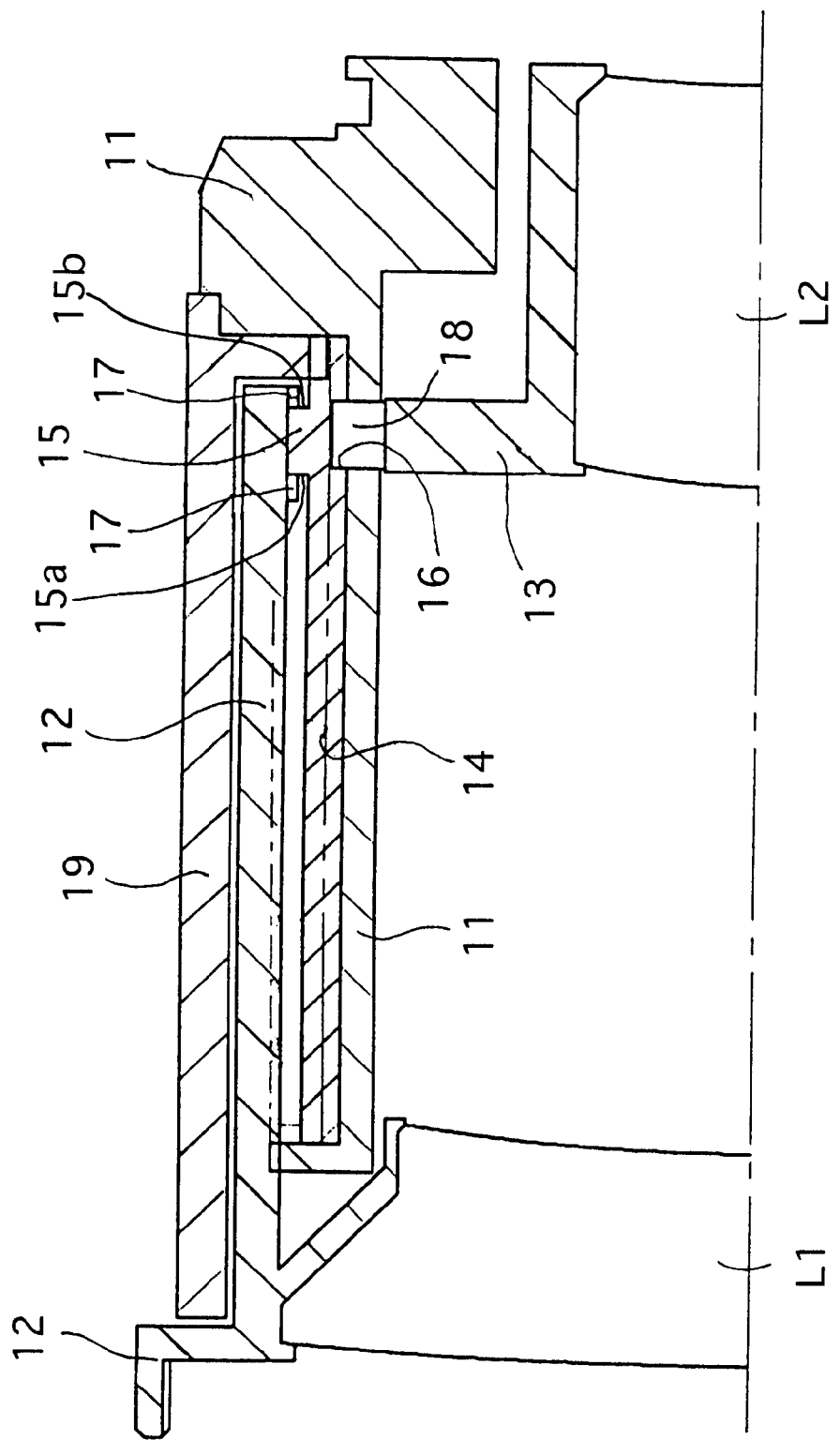
FIG. 1 is a longitudinal sectional view of an upper half of a lens barrel provided with a molded cam ring with convex cams, by way of example.

FIG. 1 shows an example of a lens barrel having a cam ring with convex cams. A first moving frame 12 having a first lens group L1 secured thereto, and a second moving frame 13 having a second lens group L2 secured thereto are guided in a stationary ring 11 secured to a camera body to move linearly in the axial direction. A cam ring 14 is rotatably fitted on the outer peripheral surface of the stationary ring 11. The cam ring 14 is provided on its outer peripheral surface with convex cams 15 and on its inner peripheral surface with lead grooves 16. The first moving frame 12 is provided with a pair of cam followers 17 which are engaged with front and rear cam surfaces 15a and 15b of the convex cams 15. The second moving frame 13 is provided with radial projections 18 which are fitted in the lead grooves 16. An outermost operation ring 19 is rotatably fitted on the stationary ring 11 and is connected to the cam ring 14 to rotate together therewith.

In the lens barrel constructed as above, when the cam ring 14 is rotated via the operation ring 19, the first moving frame 12 (first lens group L1) which is guided by the stationary ring 11 to move in the axial direction is linearly moved in accordance with the cam profile of the convex cams 15, and at the same time, the second moving frame 13 (second lens group L2) which is guided by the stationary ring 11 to move in the axial direction is moved linearly in accordance with the profile of the lead grooves 16 to carry out a zooming operation or a focusing operation.

Figure 2:
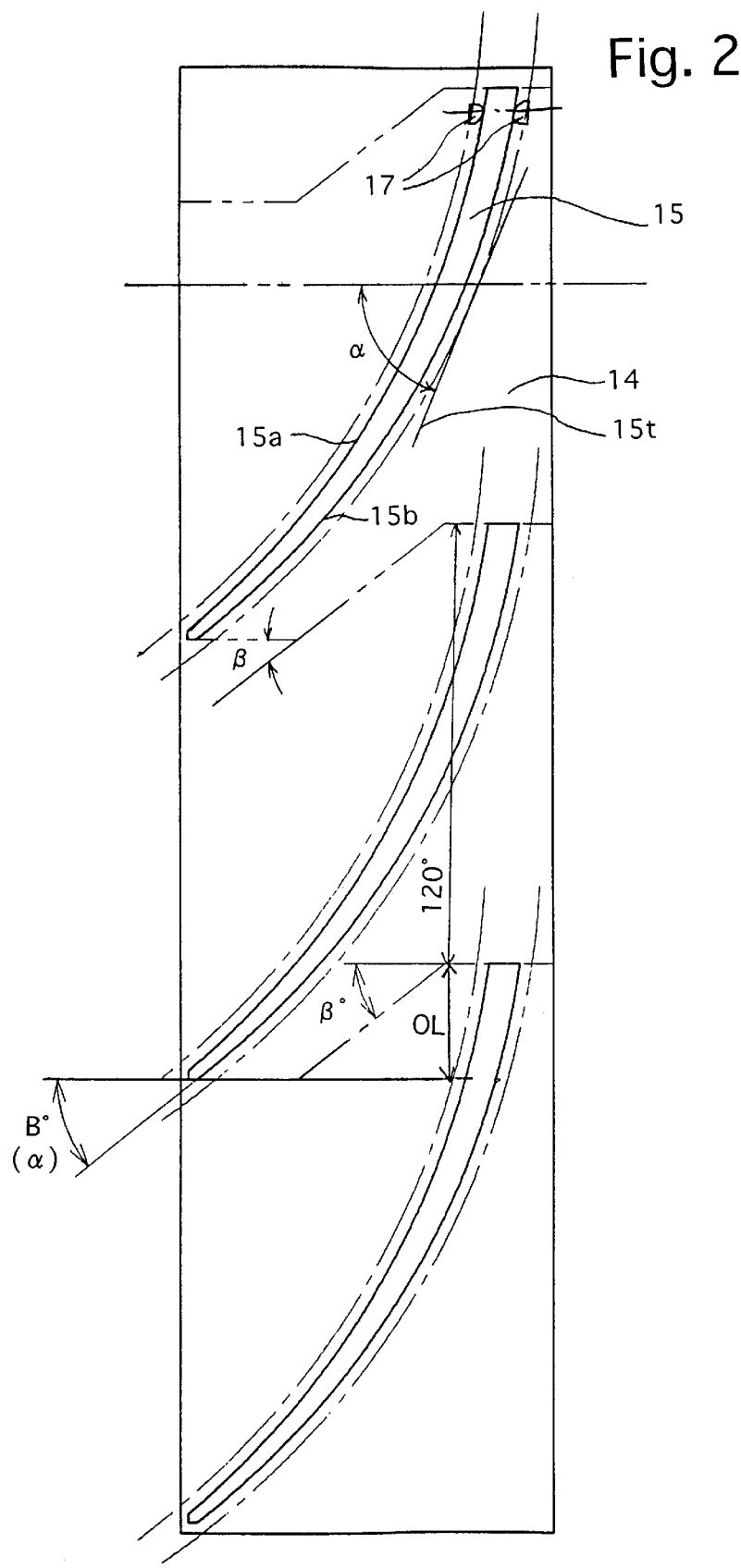
FIG. 2 is a developed view of a cam ring shown in FIG. 1 and convex cams thereof.

FIG. 2 shows a developed profile of the convex cams 15 formed on the outer peripheral surface of the cam ring 14, by way of example. The convex cams 15 are each provided with a non-linear shape of which an angle a defined between a tangential line 15t to the convex cam 15 and a plane including the axis of the cam ring 14 is smoothly varied. In the example shown in FIG. 2, the angle $\alpha$ is gradually decreased from the right side to the left side in FIG. 2. Although the shapes of the front and rear cam surfaces 15a and 15b in the axial direction are slightly different, the convex cams 15 have a similar change in the angle as a whole, so that the distance between the pair of cam followers 17 in the circumferential and axial directions of the first moving frame 12 is constant (the positions of the pair of cam followers 17 in the circumferential direction are identical in the illustrated embodiment). The cam surfaces 15a and 15b of the convex cams 15 are perpendicular to the axis of the cam ring 14 in a radial direction therefrom. Three identical convex cams 15 are formed on the cam ring 14, so that the convex cams 15 overlap each other at the ends thereof, with respect to the axial direction of the cam ring 14. The amount of overlap is indicated by OL in FIG. 2, and the angle of each convex cam 15 in the circumferential direction exceeds 120 degrees.

Figure 3:
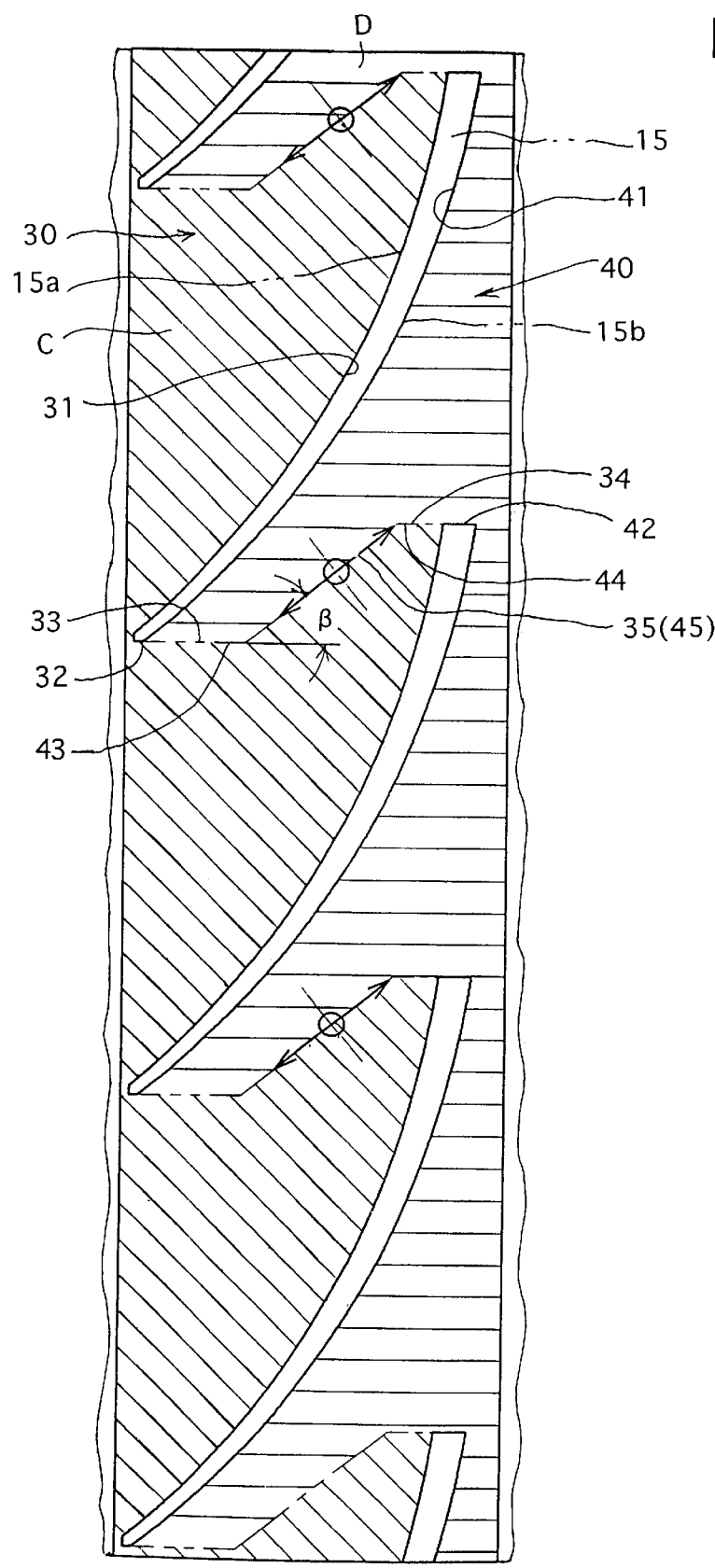
FIG. 3 is a developed view of a molding die for molding a cam ring with convex cams shown in FIG. 2.
Figure 5:
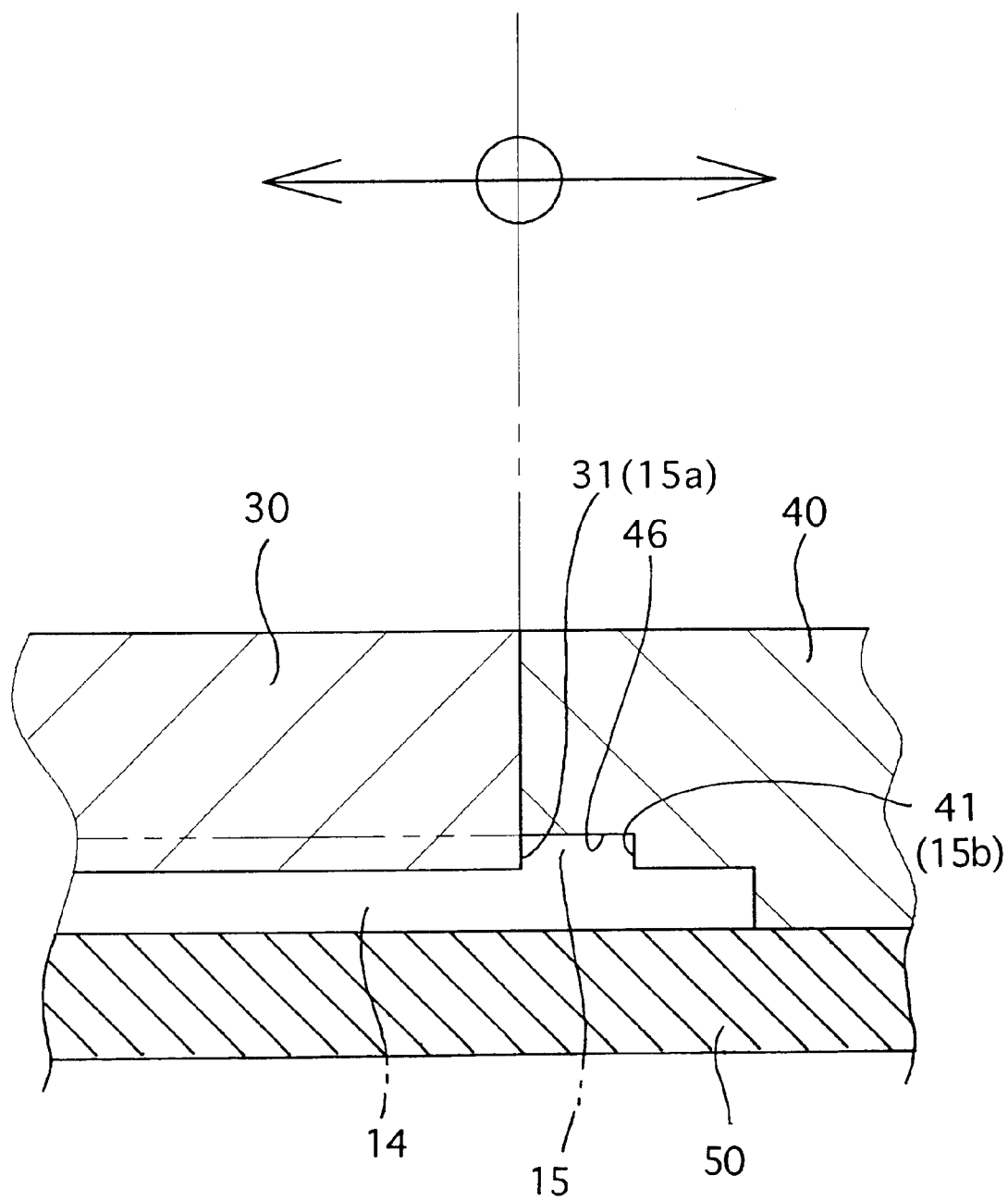
FIG. 5 is a sectional view of a molding die in a molding position, taken along the line V—V in FIG. 4A.

The present invention is addressed to a method and a die assembly for molding the cam ring 14 having the convex cams 15 constructed as above. FIGS. 3 through 5 show an embodiment of the invention. FIGS. 3 and 4A through 4D show a developed view of a pair of (first and second) cylindrical split dies 30 and 40, and FIG. 5 shows a sectional view thereof taken along a plane including the axis of the cam ring 14. The first and second cylindrical split dies 30 and 40 are cylindrical and are provided with cam forming surfaces 31 and 41 corresponding to the front and rear cam surfaces 15a and 15b of the convex cams 15, respectively.

The first cylindrical split die 30 is provided with a molding surface 32 which lies in a plane wherein the axis of the first cylindrical split die 30 also lies, and is provided with an axial parting surface 33 which is an extension of the molding surface 32 in the axial direction. The molding surface 32 corresponds to one end face of the convex cam 15 in the circumferential direction thereof. The second cylindrical split die 40 is provided with an axial parting surface 43 which extends in the axial direction parallel to, and abutting against, the axial parting surface 33. The second cylindrical split die 40 has a molding surface 42 which lies in a plane wherein the axis of the second cylindrical split die 40 also lies, and is provided with an axial parting surface 44 which is an extension of the molding surface 42 in the axial direction. The molding surface 42 corresponds to the other end face of the convex cam 15 in the circumferential direction. The first cylindrical split die 30 is provided with an axial parting surface 34 which extends in the axial direction parallel to the axial parting surface 44, and abuts against the axial parting surface 44.

The axial parting surfaces 33 and 34 and the axial parting surfaces 43 and 44 are connected by oblique parting surfaces 35 and 45 which define an angle $\beta$ (see FIGS. 2 and 3) with respect to a plane passing through the axis of the first and second cylindrical split dies 30 and 40 (cam ring 14). The angle $\beta$ of the oblique parting surfaces 35 and 45 is not greater than the minimum value of the angle $\alpha$ (minimum angle of the cam surfaces 15a and 15b), i.e., $\alpha \geq \beta$. The oblique parting surfaces 35 and 45 are entirely in surface contact with each other when the first and second cylindrical split dies 30 and 40 are located in a normal molding position as shown in FIG. 3. The axial parting surfaces 33 and 43, and the axial parting surfaces 34 and 44 are entirely brought into surface contact with each other (FIGS. 3 and 4A) when the entire surfaces of the oblique parting surfaces 35 and 45 are in contact (i.e., when the first and second cylindrical split dies 30 and 40 are located in the normal molding position).

As can be seen in FIG. 5, the second cylindrical split die 40 is provided with a molding surface 46 which defines the outer peripheral surfaces of the convex cams 15. The parting lines of the first and second cylindrical split dies 30 and 40 are located along a radial extension of the cam surfaces 15a of the convex cams 15. An annular inner surface molding die 50 is provided in the first and second cylindrical split dies 30 and 40, so that the first and second cylindrical split dies 30 and 40, and the annular inner surface molding die 50 define a mold cavity for molding the cam ring 14.

The cam ring 14 is molded using the molding die assembly constructed as above as follows. Firstly, the first and second cylindrical split dies 30 and 40 are arranged (set) in the normal molding position, as shown in FIGS. 3, 4A and 5. In this position, a synthetic resin material is introduced in the mold cavity defined by the first and second cylindrical split dies 30 and 40 and the annular inner surface molding die 50 to mold the cam ring 14 having the convex cams 15. After completion of molding, the first and second cylindrical split dies 30 and 40 are relatively rotated along the oblique parting surfaces 35 and 45, so that the cam forming surface 31 of the first cylindrical split die 30 and the cam forming surface 41 of the second cylindrical split die 40 are gradually moved away from the cam surfaces 15a and 15b of the convex cams 15 (FIGS. 4B and 4C) until the first and second cylindrical split dies 30 and 40 can be completely removed (FIG. 4D). This is possible because the angle β of the oblique parting surfaces 35 and 45 is set to be identical to or smaller than the angle α of the convex cams 15 (see FIG. 4C).

Accordingly, since a complicated split structure for the molding die assembly is not necessary for enabling the first and second cylindrical split dies 30 and 40 to be removed, parting lines are not produced on the cam surfaces 15a and 15b of the convex cams 15. Moreover, in the case that the cam surfaces 15a and 15b of the convex cams 15 (i.e., the cam forming surface 31 of the first cylindrical split die 30 and the cam forming surface 41 of the second cylindrical split die 40) are perpendicular to the axis of the cam ring 14 in a radial direction therefrom, as shown in the drawings, no draft of the molding dies is necessary. The parting structure of the annular inner surface molding die 50 from the cam ring 14 is not limited to a specific one.

Figure 6:
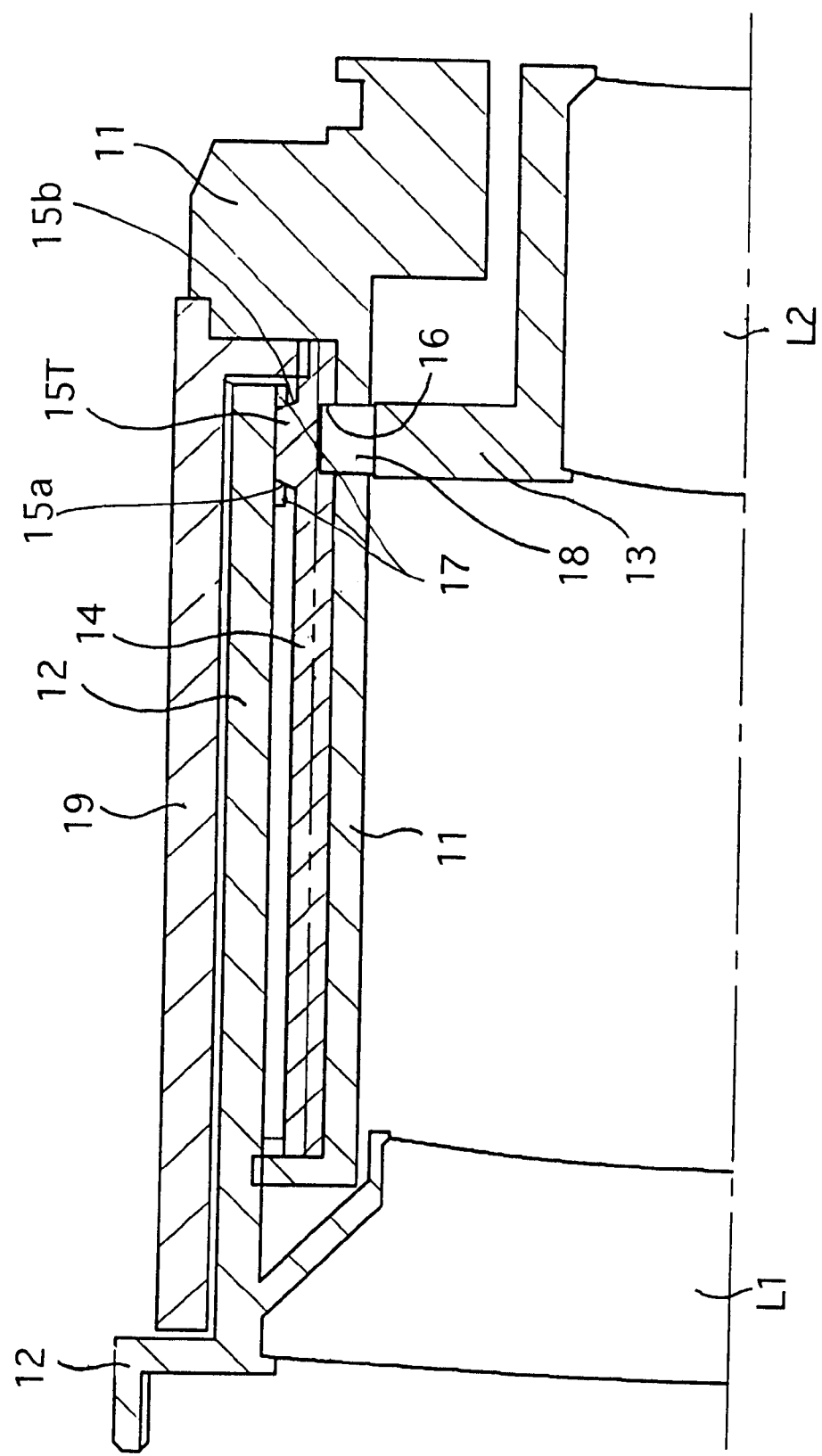
FIG. 6 is a longitudinal sectional view of an upper half of a lens barrel having a cam ring with convex cams whose sectional shape is trapezoidal.
Figure 7:
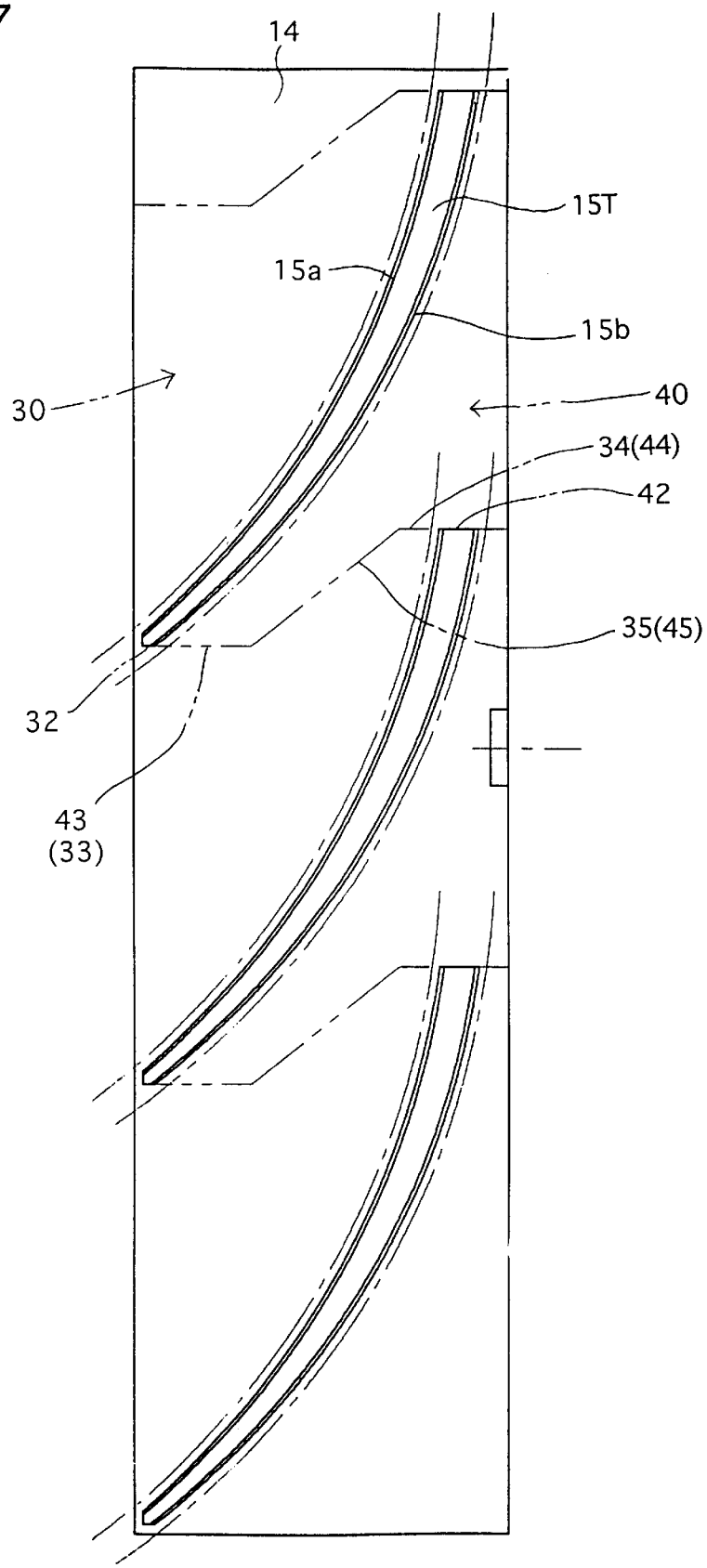
FIG. 7 is a developed view of a cam ring and trapezoidal convex cams thereof.

FIGS. 6 and 7 show convex cams 15T, having a trapezoidal cross sectional shape, formed on the cam ring 14. According to the present invention, since no draft of the molding dies is necessary, not only the trapezoidal convex cams shown in FIGS. 6 and 7, convex cams having an inverted-trapezoidal shape can also be molded.

As can be understood from the above discussion, a cam ring formed from synthetic resin mold which is provided on its peripheral surface with a plurality of identical convex cams, whose ends overlap each other in the axial direction, can be easily obtained, wherein the cam ring can be molded without producing a parting line on the cam surface.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A method for molding a cam ring from synthetic resin, said cam ring being provided on the peripheral surface thereof with a plurality of convex cams whose shape in a developed view is non-linear so that an angle defined between a tangential line on each convex cam and a plane including an axis of the cam ring is smoothly varied, said convex cams overlapping each other at the ends thereof as viewed in the axial direction of the cam ring, wherein a first cylindrical split molding die having a cam forming surface corresponding to one of front and rear cam surfaces of the convex cams, and a second cylindrical split molding die having a cam forming surface corresponding to the other of the front and rear cam surfaces of the convex cams are provided;

said method comprising:

setting said first and second cylindrical split molding dies so that the respective cam forming surfaces are located in a normal molding position to mold the cam ring having the convex cams; and upon completion of a molding operation, rotating the first and second cylindrical split molding dies relative to each other and relative to the molded cam ring, in a direction of an angle not greater than the minimum angle defined between said tangential line on each corresponding said front and rear cam surfaces and the plane including the axis of the cam ring, to thereby part said first and second cylindrical split molding dies from the molded cam ring.

2. The method for molding a cam ring with convex cams according to claim 1, wherein said cam forming surfaces of the first and second cylindrical split molding dies and a plane which includes an axis of the cam ring and intersects the cam forming surfaces are perpendicular to each other.

3. A molded cam ring having convex cams, wherein said molded cam ring is produced by a method according to claim 1.

4. A molding die assembly for molding a cam ring from synthetic resin, said cam ring being provided on the peripheral surface thereof with a plurality of convex cams whose shape in a developed view is non-linear so that an angle defined between a tangential line on each convex cam and a plane including an axis of the cam ring is smoothly varied, said convex cams overlapping each other at the ends thereof as viewed in the axial direction of the cam ring, said molding die assembly comprising:

a pair of cylindrical split molding dies having cam forming surfaces corresponding to front and rear cam surfaces of the convex cams, respectively; and oblique parting surfaces provided on said pair of cylindrical split molding dies respectively, said parting surfaces being oriented in a direction of an angle not greater than the minimum angle defined between the tangential lines on the front and rear cam surfaces and a plane including the axis of the cam ring;

wherein said oblique parting surfaces are entirely brought into surface contact with each other when the cam forming surfaces are located in a normal molding position, and said cylindrical split molding dies are relatively rotatable along the oblique parting surfaces.

5. The molding die assembly according to claim 4, wherein the cam forming surfaces of the cylindrical split molding dies and a plane which includes an axis of the molded cam ring and intersects the cam forming surfaces are perpendicular to each other.

6. A molded cam ring having convex cams, wherein said molded cam ring is produced by a molding die assembly according to claim 4.

7. A cam ring molded from synthetic resin having on the peripheral surface thereof a plurality of convex cams whose shape in a developed view is non-linear so that an angle defined between a tangential line on each convex cam and a plane including an axis of the cam ring mold is smoothly varied, said convex cams overlapping each other at the ends thereof as viewed in the axial direction of the cam ring, wherein a parting line is not produced on the cam surfaces of the convex cams by split molding dies which are used to form said cam ring mold.

8. The cam ring according to claim 7, wherein cam forming surfaces of said split molding dies and a plane which includes an axis of the molded cam ring and intersects the cam forming surfaces are perpendicular to each other.

* * * * *